United States Patent [19]

Woods et al.

[11] 4,448,229

[45] May 15, 1984

[54] PLANING JIG

[75] Inventors: William D. Woods; John H. Pigman, both of Phoenix, Ariz.

[73] Assignee: International Design Corporation, Phoenix, Ariz.

[21] Appl. No.: 355,210

[22] Filed: Mar. 5, 1982

[51] Int. Cl.³ .............................................. B27C 1/14
[52] U.S. Cl. .................................... 144/129; 144/121; 145/129
[58] Field of Search ............... 144/121, 125, 126, 127, 144/134 R, 147, 129; 145/5 R, 120, 129; 269/303, 315; 30/124; 409/303, 296

[56] References Cited

U.S. PATENT DOCUMENTS 153,343  7/1874  Jones .................................... 144/121

Primary Examiner—W. D. Bray
Assistant Examiner—Jorji M. Griffin
Attorney, Agent, or Firm—LaValle D. Ptak

[57] ABSTRACT

An apparatus for securely positioning thin work pieces for accurate joining of edges using a standard woodworker's bench plane. The plane slides on its side surface on a lower platen surface, and the blade is guided in a very straight path for the cut by a vertical surface which contacts the portion of the sole of the plane lateral to the blade. Work pieces are secured against an upper platen surface by a clamping bar, which is attached by screws at its ends to the platen. Between the clamping bar and the work piece there is a clamping caul, which applies adjustable spaced clamping forces to the work piece by means of individual screws through the clamping bar.

Attachable planing fence and miter gage accessories are also disclosed, which permit accurate repeat positioning for taper, cross-grain, and length cuts at selectable angles.

16 Claims, 12 Drawing Figures

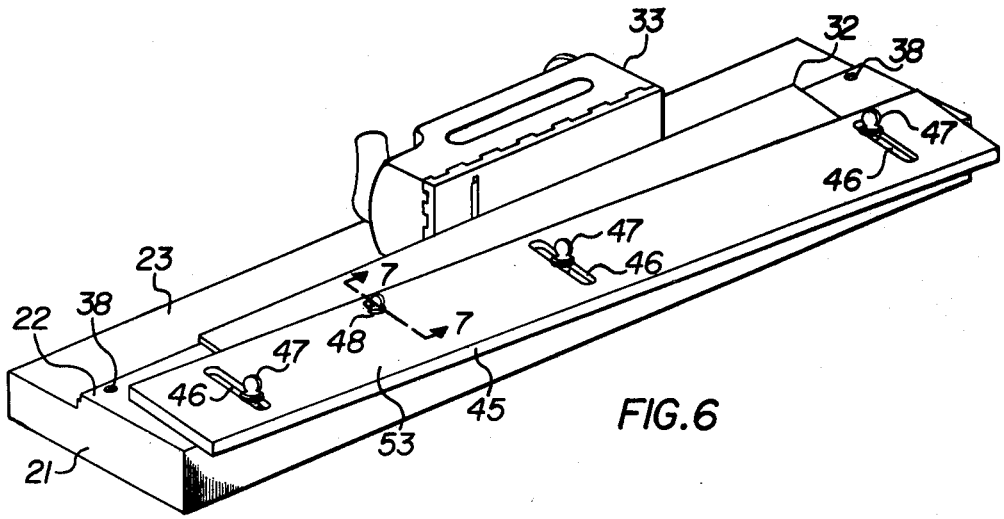
FIG.6
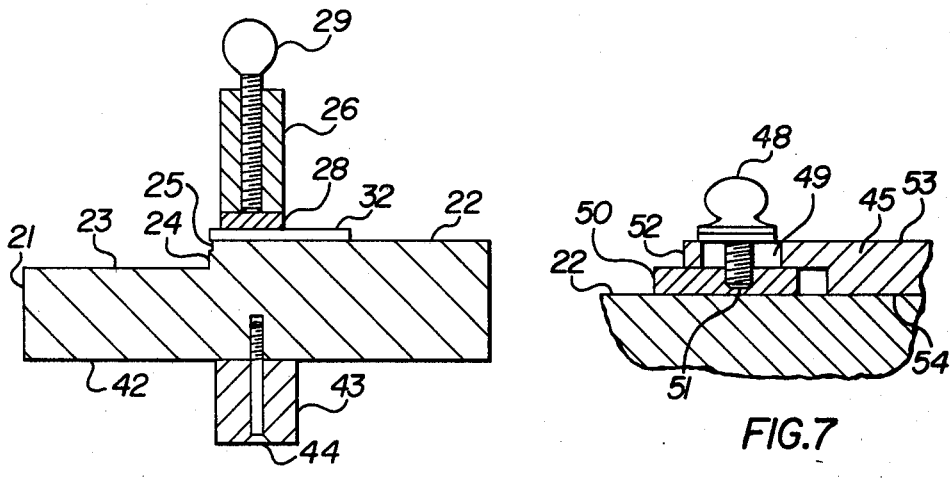
FIG.5
FIG.7
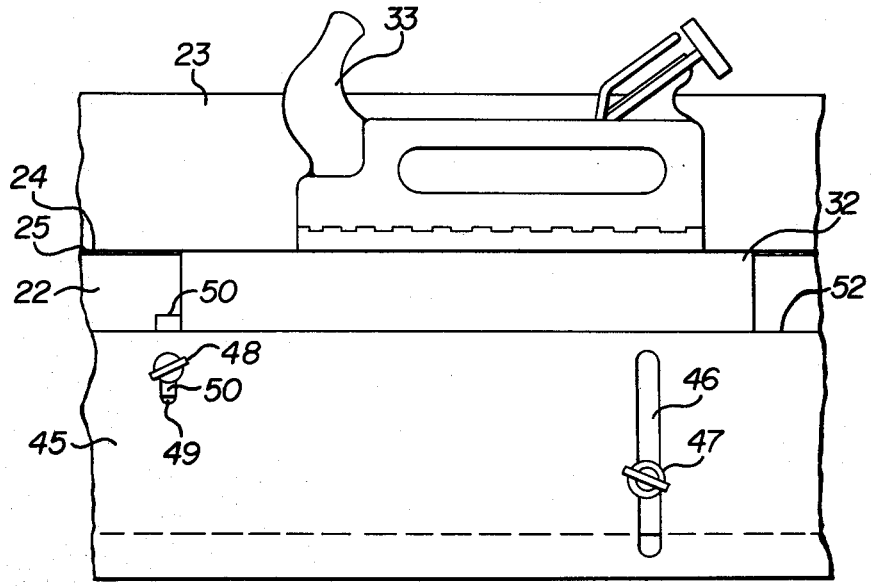
FIG.8

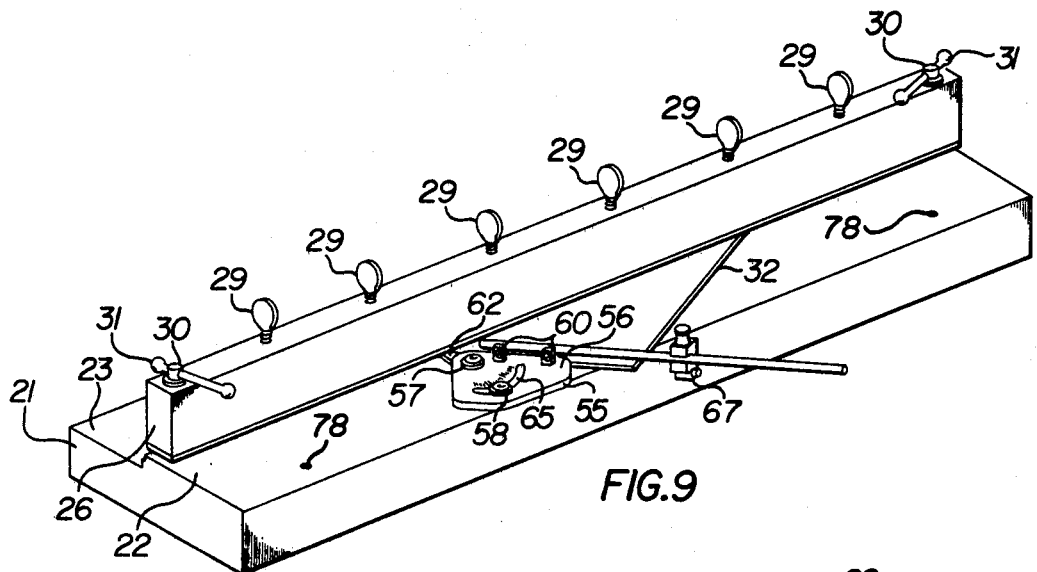
FIG.9
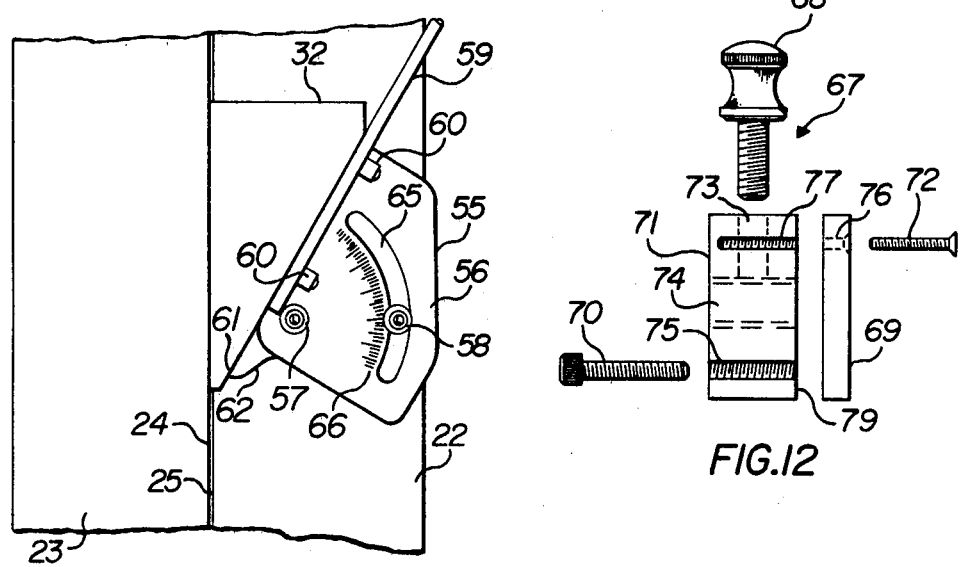
FIG.10
FIG.12
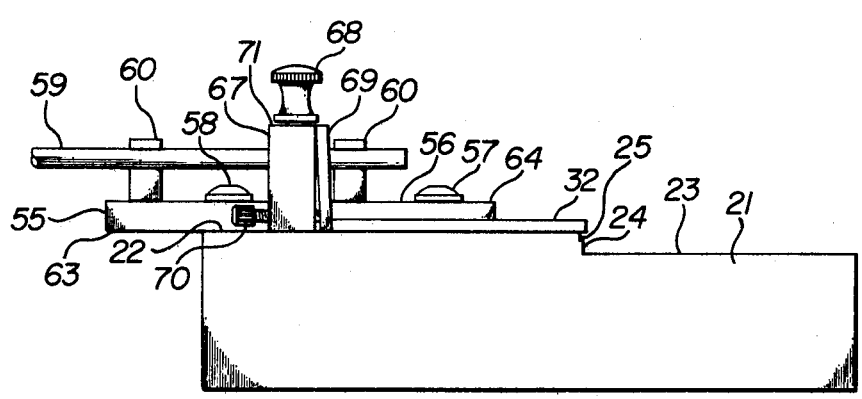
FIG.11

PLANING JIG

FIELD OF THE INVENTION

The invention relates to wood planing apparatus, and particularly to an apparatus for producing precision planar surfaces on edges of thin wood work pieces.

DISCUSSION OF RELEVANT ART

In many types of woodworking applications, especially in the manufacture of high precision products such as guitars, it is necessary to glue the edges of thin wood work pieces together to form a larger piece of the same thickness. To obtain the straight edges needed for such a process, the edges are first "joined"—that is, planed flat and square with very high precision—and then glued and clamped together.

The degree of precision of the planing process is a primary factor in the eventual quality of the glue joint produced. If there are irregularities in the planed edges, the glue joint will be defective in a number of ways. If the unevenness is severe enough, and particularly when light-colored woods are being glued, there may be a visible glue line, which detracts from the aesthetic appearance of the article. If the mismatched surfaces are forced together to "clamp out" any visible glue line, internal stresses result in the completed and dried glue joint which are eventually relieved by the gradual warping of the wood, or by the failure of the glue joint itself. Such internal stresses are particularly unacceptable in musical instruments, for they deleteriously affect the second quality of the instruments, as does eventual warping of the wood or failure of the glue joint.

In order to produce glue joints for wood work pieces which avoid the above problems, it is necessary to obtain tolerances in a joining operation on the order of one or two mils. This level of tolerance cannot be achieved by the use of mechanical powered wood joiners, which inevitably produce narrowly-spaced ripples in the edge surfaces of work pieces. At present there are no precision tools or apparatus known to exist which are capable of positioning a wood work piece and guiding a cutting edge so as to facilitate the joining of a precisely flat, smooth and square edge surface. The only methods known involve a high degree of skill and experience, and still do not guarantee repeatable and accurate results.

It is also a common woodworking task to plane an edge of work piece to a precise angle, taper or length with relation to other edges of the work piece, and to produce in the process an edge suitable for gluing. The methods currently available to accomplish these results are even more difficult, requiring more expertise and trial-and-error, than simply obtaining an edge suitable for gluing.

There is clearly an unmet need in the woodworking art for an apparatus and method for producing extremely high tolerance, planar edge surfaces on wood work pieces at predeterminable angular and dimensional relationships to other edges of the work pieces.

OBJECTS OF THE INVENTION

It is an object of the invention to provide a method and apparatus for producing extremely high tolerance planar edge surfaces on wood work pieces.

It is another object of the invention to provide a method and apparatus to facilitate convenient positioning of a wood work piece and to precisely guide a cutting edge of a bench plane along an edge surface of the work piece to produce a high precision planar edge surface thereon.

It is an additional object of the invention to provide a joining method and apparatus to faciliate precise joining of a work piece to a predetermined width or taper.

It is also an object of the invention to provide a joining method and apparatus to facilitate precise planing of one edge surface of a wood work piece at selected angles with relation to other edge surfaces.

It is yet another object of the invention to provide a method and apparatus for precisely planing a wood work piece to a selected length.

It is a further object of the invention to provide a joining method and apparatus which avoids the shortcomings of known joining methods and apparatus.

SUMMARY OF THE INVENTION

The invention, a planing jig, is an apparatus for securely clamping a work piece in position and guiding a standard bench plane along one edge to produce a precisely flat, smooth joined edge suitable for gluing.

The planing jig, in combination with a standard wookworker's bench plane, consists of a platen with a horizontal planar upper surface against which the work piece is clamped, and a horizontal planar lower surface on which a bench plane, resting on its side with the blade toward the upper surface of the platen, slides. A vertical planar plane-guide surface is located between the two horizontal surfaces, and guides the plane in a perfectly flat path by contacting that portion of the sole of the plane flanking the blade. At the top of the plane-guide surface, and adjacent to the upper surface of the platen, is an edge groove, over which the edge of the work piece projects in order to contact the blade, and which is dimensioned so as to prevent the blade from ever coming into contact with the material of the platen.

The work piece is clamped to the upper surface of the platen by a clamping bar, which attaches at its ends to the platen by means of clamping screws threaded into the upper surface. Interposed between the clamping bar and the work piece is a clamping caul, which can apply individually adjustable clamping forces to the work piece by means of caul clamping screws, which thread through the clamping bar and engage the upper surface of the clamping caul. A clamping block can be attached to the bottom surface of the platen to enable the entire apparatus to be clamped securely in place by means of a standard bench vise.

Two accessories are also disclosed for use with the planing jig—a planing fence and a miter gage, either of which can be used in conjunction with the clamping bar. The planing fence adjustably attaches to the upper surface of the platen to provide a reference surface against which a straight edge of a work piece can be aligned, to accomplish a parallel or taper cut at variable widths. A retractable dog can be extended from the reference surface to hold the work piece against planing forces when the planing fence is utilized without the clamping bar.

The miter gage adjustably attaches to the upper surface of the platen so that it can be accurately and rapidly pivoted to angles of 0 to 90 degrees between a miter reference surface and the plane-guide surface, using a built-in protractor scale to set the angle. It is particularly useful for cross-grain joining at 90 degree or other large angles to the wood grain. A length stop permits the miter gage to be used to plane work pieces to precise lengths. The length stop has a fine adjustment feature for high precision dimensioning.

BRIEF DESCRIPTION OF THE DRAWINGS

FIG. 5 is a section view of the planing jig taken along the section line 5—5 of FIG. 1.

FIG. 6 is an isometric view of the planing jig with the planing fence attached and the bar assembly removed, with bench plane in position to plane a tapered work piece.

FIG. 7 is a partial section view of the planing jig taken along the section line 7—7 of FIG. 6.

FIG. 8 is a partial top view of the planing jig with the fence in place, clamping bar assembly removed, the retractable dog engaging a work piece and a bench plane in position.

FIG. 9 is an isometric view of the planing jig with the clamping bar assembly and miter gage assembly in position.

FIG. 10 is a partial top view of the planing jig with the clamping bar assembly removed and the miter gage assembly in position.

FIG. 11 is an end view of the planing jig with the clamping bar assembly removed and the miter gage assembly in use, with the length stop assembly in position against the work piece.

FIG. 12 is an exploded view of the length stop assembly of the planing jig.

DESCRIPTION OF THE INVENTION

Figure 1:
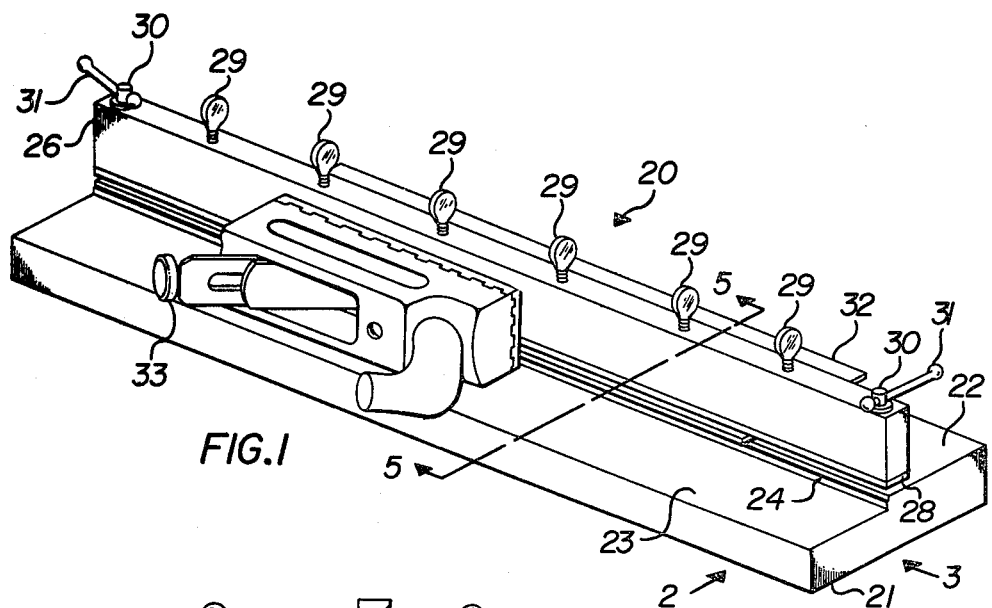
FIG. 1 is an isometric view of the planing jig with the clamping bar assembly and a bench plane in position.

Referring now to the drawings, a planing jig 20 is disclosed having as its primary function the positioning and secure holding of wood work pieces 32 so as to facilitate accurate planing of selected edges by means of a standard bench plane 33. FIG. 1 shows the planing jig 20 with a work piece 32 securely clamped between the upper surface 22 of a platen 21 and a clamping bar assembly 26. Riding upon its side surface 41 along the lower surface 23 of the platen 21 is a standard bench plane 33, with its blade 39 (See FIGS. 3 and 4) in contact with the work piece 32.

Figure 2:
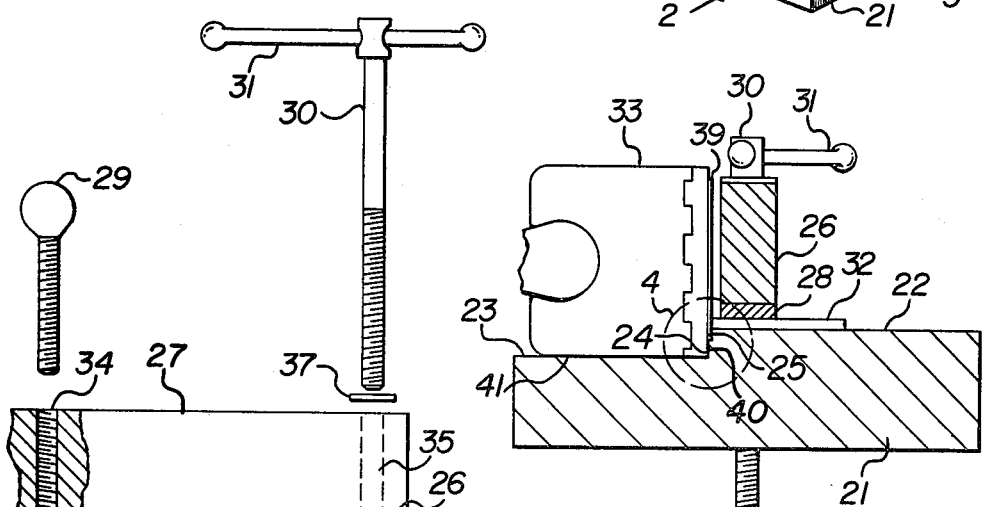
FIG. 2 is a partial view of the planing jig indicated by view 2 of FIG. 1, partially cut away to show internal details.

FIG. 2 reveals further the details of the clamping bar assembly 26, which is attached to the upper surface 22 of the platen 21 by means of two bar clamping screws 30, which are located at either end of the clamping bar assembly 26 and project through washers 37 and unthreaded holes 35 and 36 in a clamping bar 27 and a clamping caul 28, respectively, to engage threaded holes 38 in the platen 21. The bar clamping screws 30 are equipped with sliding handles 31 which can be positioned to avoid interference with the bench plane 33 during a planing operation.

Between the bar clamping screws 30, a plurality of caul clamping screws 29 thread into threaded holes 34 which extend through the clamping bar 27. Tightening the caul clamping screws 34 brings them into contact with the upper surface of the clamping caul 28. When the clamping bar assembly 26 is attached to the platen 21 with a work piece 32 in position between the bottom surface of the clamping caul 28 and the upper surface 22 of the platen 21, the caul clamping screws 29 can be employed to exert a spaced downward clamping force on the work piece 32, the magnitude of which is individually adjustable in the region of each caul clamping screw 29, by varying the torque on each. This assures optimal positioning and stability of the work piece 32 for the planing operation.

Figure 3:
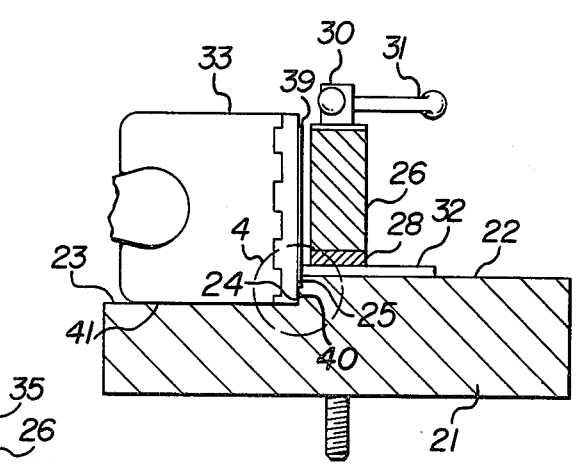
FIG. 3 is an end view of the planing jig from the direction indicated by view 3 of FIG. 1.
Figure 4:
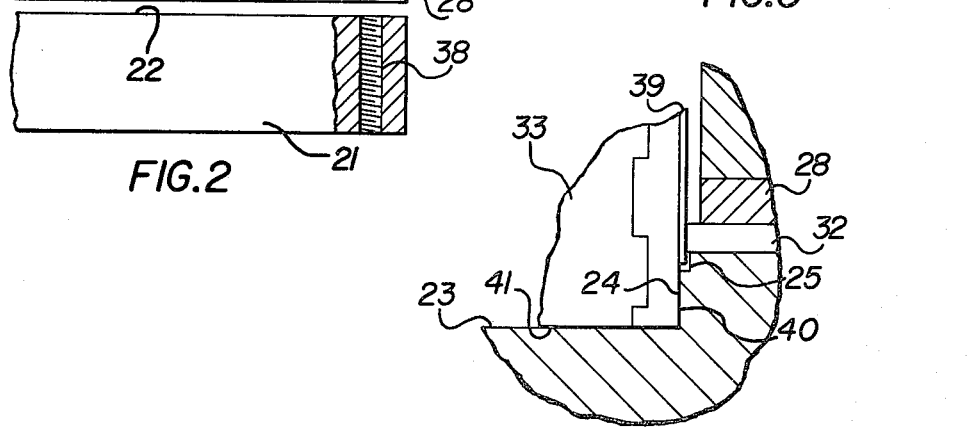
FIG. 4 is an enlarged portion of FIG. 3 circled and identified as view 4.

FIGS. 3 and 4 provide a more detailed look at the actual planing operation. The bench plane 33 can be seen sliding on its side surface 41 along the lower surface 23 of the platen 21. A portion of the sole surface 40 of the bench plane 33 outside the width of the blade 39 is in contact with the plane-guide surface 24 of the platen 21. The plane-guide surface 24 is machined precisely flat and perpendicular to the lower surface 23 of the platen 21, so that the bench plane 33 is guided along in a very precisely flat path. The plane-guide surface 24 does not extend all the way to the upper surface 22, but ends further down to define an edge groove 25, which prevents the blade 39 from coming into contact with the material of the platen 21, thus avoiding undue damage or wear to the blade 39. The work piece 32 can be seen in FIGS. 3 and 4 securely clamped between the upper surface 22 of the platen 21 and the clamping caul 28, and extending over the edge groove 24.

FIG. 5 illustrates the action of the caul clamping screws 29 which exert a downward force against the upper surface of the clamping caul 28, the magnitude of which can be individually controlled for each caul clamping screw 29 by the torque applied. In addition, the clamping block 43 can be seen attached to the bottom surface 42 of the platen 21 by means of clamping block screws 44. This enables the planing jig 20 to be mounted between the jaws of an ordinary bench vise (not shown).

FIGS. 6, 7 and 8 illustrate the use of the planing fence 45. This attachment to the planing jig 20 permits rapid and accurate positioning of a work piece 32, including positioning for planing of tapered work pieces 32 as shown in FIG. 6. The planing fence 45 attaches to the upper surface 22 of the platen 21 by means of three fence clamp screws 47, which project through straight elongated slots 46 in the planing fence 45 from its top surface 53 to its bottom surface 54, and thread into threaded holes 78 (See FIG. 9) in the upper surface 22 of the platen 21. The elongated slots 46 are of sufficient width to enable the planing fence 45 and thereby the fence reference surface 52 against which the work piece 32 is positioned, to be oriented within a range of angles to the plane-guide surface 24. The planing fence 45 can be used in conjunction with the clamping bar assembly 26, or by itself.

To provide more positive holding of the work piece 32 against loads inherent in the planing operation when the planing fence 45 is being employed without the clamping bar assembly 26, a retractable dog 50 is built into the planing fence 45. When in retracted position as in FIG. 6, the retractable dog 50 is drawn within the elongated groove 49 so that it does not interfere with a work piece 32 being positioned against the fence reference surface 52 of the planing fence 45. By loosening the dog clamp screw 48 which threads into a threaded hole 51 in the retractable dog 50, it is possible to slide the retractable dog 50 to a position where it extends out from the fence reference surface 52. In the extended position as shown in FIG. 8, the retractable dog 50 can be used to prevent sliding of a work piece 32 along the fence reference surface 52 during the planing operation.

FIGS. 9, 10, 11 and 12 show the configuration and use of the attachable miter gage assembly 55 of the planing jig 20. The miter gage assembly 55, used in conjunction with the clamping bar assembly 26, permits the planing of edges of a work piece 32 at precise angles with respect to other straight edges of the work piece 32.

The miter gage assembly 55 has as an element a miter gage body 56, which can be attached to the upper surface 22 of the platen 21 by means of two screws, a pivot screw 57 and a scale screw 58, both of which thread into holes (not shown) in the upper surface 22 of the platen 21, and which, when tightened, securely clamp the miter gage assembly 55 in position. The pivot screw 57 projects through a round hole (not shown) in the miter gage body 56, from the top surface 64 to the bottom surface 63, and provides a stable vertex for the setting of angles. The scale screw 58 projects through a scale slot 65 on which a protractor scale 66 is visibly marked to facilitate rapid setting of the angle between the miter reference surface 61 and the plane-guide surface 24. The miter gage body 56 has a reference extension 62 by which the length of the miter reference surface 61 is extended, but which is less thick than the rest of the miter gage body 56 so that it can fit underneath the clamping bar assembly 26 without interfering with the clamping action on the work piece 32.

Attached to the miter gage body 56 by means of rod retainers 60 is the length stop rod 59, on which rides the length stop assembly 67, which can be positioned along the length stop rod 59 to provide accurate and repeat positioning of one corner of the work piece 32. FIG. 11 shows the length stop assembly 67 in use to plane a work piece 32 to length. With the miter gage assembly 55 set to the 90 degree position (representing the angle between the miter reference surface 61 and the plane-guide surface 24), a work piece 32 is positioned with one straight edge against the miter reference surface 61, and the length stop assembly 67 clamped on the position on the length stop rod 59 representing the length desired between the planed edge and the opposite edge of the work piece 32. This clamping of the length stop assembly 67 is accomplished by tightening the length stop clamp screw 68 against the length stop rod 59. Increased accuracy and minor adjustments can be achieved by use of the fine adjustment screw 70, the tightening of which causes the fine adjustment leaf 69 to be displaced from the length stop body 71.

FIG. 12 shows further details of the length stop assembly 67. The length stop body 71 has a rod groove 74 in which the length stop rod 59 fits. The length stop clamp screw 68 threads into a threaded hole 73 which opens into the rod groove 74, so that when the length stop clamp screw 68 is tightened, it impinges on the rod groove 74 and engages the length stop rod 59.

The length stop body 71 has a planar stop reference surface 79 perpendicular to the length stop rod 59 when the length stop assembly 67 is mounted thereon, and located so as to engage an edge of a work piece 32. Interposed between the stop reference surface 79 and the work piece 32 is the fine adjustment leaf 69, which is attached to the length stop body 71 by means of a leaf anchor screw 72, which projects through an unthreaded hole 76 in the fine adjustment leaf 69 and threads into a threaded hole 77 in the length stop body 71. The fine adjustment screw 70 threads into a threaded hole 75 extending extending through the length stop body 71 and engages the fine adjustment leaf 69 in such a way that the portion of the fine adjustment leaf 69 in contact with a work piece 32 is displaced away from the stop reference surface 79 when the fine adjustment screw 70 is tightened.

The embodiment herein disclosed is the best mode contemplated for accomplishing the inventive concepts of the planing jig. However, other embodiments of the inventive concepts are possible, and no limitation on the scope of the invention should be inferred except as required by the scope of the appended claims.

What is claimed is:

1. A planing jig for facilitating hand planing an edge of a flat work piece using a bench plane having a planar sole surface, a blade having a straight cutting edge parallel to and extending from the sole surface and a planar side surface which is perpendicular to the sole surface and perpendicular to the cutting edge, said blade being spaced inwardly from said side surface, said planing jig including in combination:
    (a) a platen, comprising:
        (i) a horizontal planar upper surface, and
        (ii) a horizontal planar lower surface, parallel to said upper surface, and
        (iii) a vertical planar guide surface, perpendicular to and located between said upper and lower surfaces, wherein the maximum vertical dimension from said lower surface to any point on said guide surface is less than the minimum distance between the blade and the side surface of such bench plane, and
        (iv) an edge groove located immediately between said guide surface and said upper surface, and shaped in such a manner that, when such bench plane is positioned with the side surface thereof in contact with said lower surface, and the sole surface of such plane is in contact with said guide surface, the blade of such plane cannot come into contact with any material comprising said platen, and
    (b) means for clamping a work piece securely onto said upper surface of said platen with the edge to be planed extending beyond said upper surface and above said edge groove.

2. A planing jig as set forth in claim 1, wherein said means for clamping a work piece comprises:
    (a) an elongated clamping bar, and
    (b) means for clamping the ends of said clamping bar to said platen and producing a clamping force toward said upper surface in order to clamp the work piece between the clamping bar and said upper surface.

3. A planing jig as set forth in claim 2, wherein the means for clamping the ends of said clamping bar to the platen comprise two clamping bolts which project through holes in said clamping bar and thread into threaded holes in said upper surface.

4. A planing jig as set forth in claim 2, or 3 further including a clamping caul interposed between said clamping bar and work piece.

5. A planing jig as set forth in claim 4, wherein a plurality of caul clamping screws are threaded into threaded holes extending through the clamping bar, which threaded holes are so located that when a work piece is clamped into the planing jig, tightening said caul clamping screws causes them to engage the clamping caul in such a manner that a local biasing force is created in the region of said caul clamping screws, and individual clamping forces are transmitted to the work piece.

6. A planing jig as set forth in claim 1 or 2, further comprising a planing fence, said planing fence comprising:
   (a) a fence body having a vertical planar fence reference surface, and
   (b) means for adjustably attaching said fence body to said upper surface so as to permit selection from a range of angular relationships between said fence reference surface and said guide surface, including in that range a parallel relationship.

7. A planing jig as set forth in claim 6, wherein said fence body further comprises:
   (a) a horizontal planar top surface, perpendicular to said fence reference surface, and
   (b) a horizontal planar bottom surface, parallel and opposite to said top surface, and which contacts said upper surface when said planing fence is attached to said platen, and
   (c) a plurality of straight elongated slots, extending completely through said fence body from said top surface to said bottom surface, the major axis of each elongated groove being perpendicular to said fence reference surface, and
wherein said means for adjustably attaching said fence to said upper surface comprises a plurality of fence screws, one of which projects through each o said elongated grooves and screws into a threaded hole in said upper surface.

8. A planing jig as set forth in claim 7, wherein said planing fence further comprises a retractable dog which can be extended out from said fence reference surface to engage one end of the work piece, in order to prevent motion of the work piece along the fence reference surface under the loads created by a planing operation, and which can be retracted into the body of said planing fence when not in use.

9. A planing jig as set forth in claim 1 or 2, further comprising a miter gage, said miter gage comprising:
   (a) a miter gage body having a vertical planar miter reference surface, and
   (b) means for adjustably attaching said miter gage body to said upper surface so as to permit selection from a range of angular relationships between said miter reference surface and said guide surface, including in that range a perpendicular relationship.

10. A planing jig as set forth in claim 9, wherein said miter gage body further comprises:
    (a) a horizontal planar bottom surface, perpendicular to said miter reference surface, and which contacts said upper surface when said miter gage body is attached to said upper surface, and
    (b) a top surface opposite to said bottom surface, and
    (c) a circular pivot hole extending completely through said miter gage body from said top surface to said bottom surface, and
    (d) an arcuate scale slot, extending completely through said miter gage body from said top surface to said bottom surface, the major centerline of which describes a circular arc which has as its center the center of said circular pivot hole, and
wherein first and second threaded holes are located in said upper surface so that projecting a pivot screw through said circular pivot hole and threading it into said first threaded hole, and projecting a scale screw through said scale slot and threading it into said second threaded hole permits a range of angles spanning the range from 0 degrees to 90 degrees between said miter reference surface and said guide surface to be obtained.

11. A planing jig as set forth in claim 10, wherein a protractor scale is visibly marked along said scale slot, the markings of said protractor scale representing the angle between said miter reference surface and said guide surface.

12. A planing jig as set forth in claim 11, wherein said miter gage further comprises:
    (a) a length stop, and
    (b) means for adjustably locating said length stop along a line parallel to said miter reference surface and projecting through a work piece having one straight edge in contact with said miter reference surface, and
    (c) means for firmly clamping said length stop in a desired position.

13. A planing jig as set forth in claim 12, wherein said miter gage further comprises a length stop rod, attached to said miter gage body so as to be parallel to said miter reference surface and to said bottom surface, and on which length stop rod said length stop can be slideably mounted.

14. A planing jig as set forth in claim 13, wherein said length stop comprises:
    (a) a length stop body, and
    (b) a rod groove in said length stop body through which said length stop rod projects when said length stop is mounted thereon, and
    (c) a planar stop reference surface, perpendicular to said length stop rod when said length stop is mounted thereon, so positioned as to contact an edge of a work piece opposite to the edge to be planed, and
    (d) a threaded hole extending through said length stop body from said rod groove, and
wherein said means for clamping said length stop into a desired position comprises a clamp screw threaded into said threaded hole.

15. A planing jig as set forth in claim 14, wherein said length stop further comprises:
    (a) a threaded hole projecting through said length stop body, parallel to said length stop rod when said length stop is mounted thereon, said threaded hole emerging on said stop reference surface,
    (b) a fine adjustment leaf, opposed onto said stop reference surface and anchored to said stop reference surface at a point further displaced from the region of said stop reference surface which intersects said bottom surface than is said threaded hole, said fine adjustment leaf extending over said threaded hole and inerposed between said stop reference surface and an edge of a work piece in contact with said length stop, and
    (c) a fine adjustment screw, threaded into said threaded hole to engage said fine adjustment leaf so that when said fine adjustment screw is tightened, said fine adjustment leaf is partially displaced from said stop reference surface.

16. A planing jig as set forth in claim 1, wherein said platen further comprises a horizontal planar bottom surface, parallel and opposite to said upper and lower surfaces, and said planing jig further comprises a clamping block which can be securely attached to said bottom surface, and which is shaped so as to be clampable between the jaws of a bench vise when said clamping block is attached to said bottom surface.

* * * * *